Figure 1:
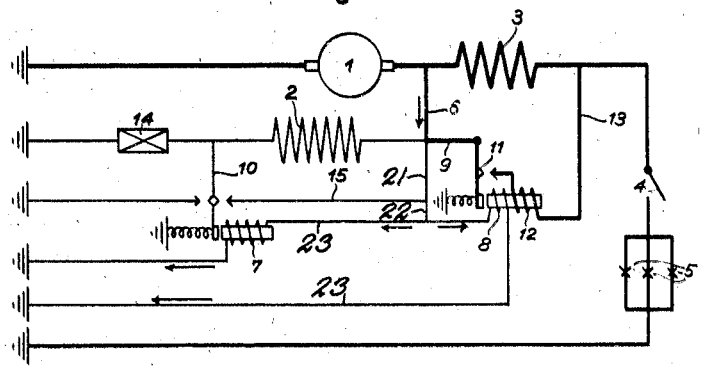

June 16, 1931.  A. MATTES  1,810,288

VOLTAGE REGULATION FOR ELECTRIC GENERATORS

Filed June 20, 1927

Inventor
Alfred Mattes
by Stewart & McKay
his attorneys

Patented June 16, 1931

1,810,288

UNITED STATES PATENT OFFICE

ALFRED MATTES, OF STUTTGART, GERMANY, ASSIGNOR TO ROBERT BOSCH AKTIEN-GESELLSCHAFT, OF STUTTGART, GERMANY

VOLTAGE REGULATION FOR ELECTRIC GENERATORS

Application filed June 20, 1927, Serial No. 200,166, and in Germany June 26, 1926.

This invention relates to regulators for the voltage in electric generators and has particular reference to regulators for electric light machines for self-propelled vehicles of all kinds.

Hitherto, in the case of generators running with varying or fluctuating speeds and having a rectified exciting current in shunt-circuit, it has been the practice to switch a resistance in or out of the shunt-circuit by means of a trembler-regulator. This method of regulation has, however, been found to be ineffectual in the case of a series exciting winding of relatively great extent, such as is desirable for a rapid start of the machine.

My invention has the object to circumvent the difficulties thus indicated by weakening the action of the main current winding by the action of an automatic regulator. Similar connections have been employed heretofore for compound motors but their employment in generators as carried out under this invention leads to the new and particularly useful result of combining a rapid start with very good voltage-regulation, even in the case of very high speed.

In the drawings accompanying this specification, I have represented three different connections for compound machines for lighting self-propelled vehicles without batteries.

In these drawings—

Figure 2:
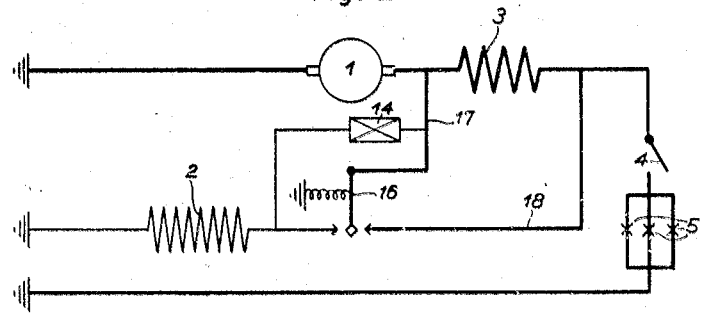

Fig. 1 represents a connection in which the excitation of the series winding is directly weakened by introducing a resistance in parallel;

Fig. 2, a similar but somewhat simplified connection, and

Figure 3:
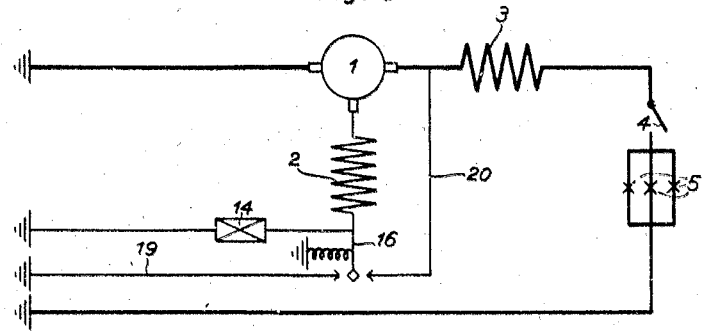

Fig. 3, a connection wherein the excitation can be weakened directly by reversing the current in the shunt circuit.

In all the figures the same parts are designated by the same reference characters.

In Fig. 1 the armature 1 is shown as provided with a series exciting winding 3 and a shunt-exciter winding 2. The series winding is connected with the lamps 5 by way of a hand-switch 4. A branch-conductor 6 is connected to the circuit in advance of the series winding, as shown, said branch conductor being connected to the shunt-winding 2, and also to two tension or voltage-coils 7 and 8, included in the circuit 23, connected with branch conductor 6 by conductors 21 and 22 and to a conductor 9. The coil 7 forms part of a trembler-regulator, which regulates the shunt excitation in the usual manner. The coil 8 forms part of a regulator comprising an armature 11 connected to the conductor 9. This regulator also comprises a second coil 12 which, as shown, is so arranged as to connect with the conductor 9. when the regulator is closed and which is connected to the series exciting winding 3 by way of conductor 13.

This circuit arrangement operates as follows: When the speed of revolution of the generator is low the armatures 10 and 11 of the two regulators remain at rest, so that the two exciter windings remain unaffected, the dynamo being so constructed as to furnish the necessary voltage for the lamps 5 at low speed when switched into the circuit. As the speed of revolution increases, however, this voltage rises until, when it has reached a predetermined point, the regulator 8, 11, closes the circuit 6—9—11—12—13 by reason of the attraction of armature 11 by coil 8. Thereby the current is divided between this and the series winding in the inverse ratio of the respective circuit-resistances, the series excitation being consequently reduced or weakened. The armature 11, however, does not return to its original position, whereby it would again break the latter circuit 6—9—11—12—13 at this stage, because of the concurrent cooperation therewith of the coil 12 forming a part of the said latter circuit. Only after the voltage has decreased with the decrease of the speed of revolution, the regulator will interrupt this circuit, thereby permitting the series excitation to rise to its original or normal strength. If, on the contrary, the speed of rotation increases, the generated voltage will rise and, when it has reached an amount greater than that necessary to close the regulator 8, 11, it will close also the make-and-break regulator 7, 10, which in turn acts to reduce the energizing effect of the shunt-exciting circuit by passing the entire current of the shunt exciting circuit 2 through resistance 14, and, when the voltage exceeds a given amount, short-circuiting said shunt exciting circuit over the conductor 15.

In the modified circuit arrangement illustrated in Fig. 2 the series winding and the shunt winding are governed by a single make-and-break or trembler-regulator 16, whose exciting coil has not been shown for the sake of simplicity. In the position of repose the armature 16, connects the shunt winding 2 to a conductor 17. When the armature is in its intermediate position, as shown, a resistance 14 is in circuit with said shunt winding; when it is in its end position, the conductor 17 is in circuit with a conductor 18, so that the circuit 17—16—18 is closed in parallel with the series excitation winding 3. In a circuit arrangement of this character, therefore, the shunt-excitation is first weakened and, if this should not be sufficient, the series excitation also.

In the further modification appearing in Fig. 3 a single regulator is again employed, as under the arrangement of Fig. 2. Under this mode of arrangement the shunt excitation winding 2 is connected to a third brush of the dynamo 1 and is also connected to the armature of the regulator 16. This armature in its position of rest connects with the conductor 19. In its intermediate position a resistance 14 is put into circuit with the shunt excitation 2, while in the final position of the armature the said shunt excitation is in circuit with one of the main-brushes of the dynamo over the conductor 20, so that it will then be traversed by a counter current. Thereby the magnetic field of the series excitation winding 3 is directly diminished.

The series excitation field may be diminished in many other ways under my invention, and, in general, the arrangements shown may be varied within the requirements of the prior art without departing from my invention as pointed out in the claims.

What I claim and desire to secure by Letters Patent is:

1. The combination, with a generator having a series exciting winding, of a voltage regulating system comprising an automatic regulator arranged in circuit with the series exciting winding of the generator, said regulator comprising a make-and-break armature in combination with a tension coil and a current coil. the current-coil being arranged to be put into circuit with the series-winding through said armature to weaken the effect of said series winding.

2. The combination, with a generator having a series exciting winding, of a voltage regulating system comprising a regulator having an armature contact, a voltage energizing coil and a second coil, the voltage coil being connected for energization by the generator and the second coil being connected in multiple with the said series winding through said armature contact and arranged to augment the effect of the voltage coil.

3. The combination, with a generator having series and shunt exciting windings energized by currents having the same direction at low generator speed, of a voltage regulating system comprising a regulator having a voltage energizing coil connected for energization by the generator, and a current coil for the regulator arranged, upon energization of the regulator, to be connected in parallel with the series winding of the generator for the purpose described.

4. An electric generator comprising series and shunt field windings both effective at voltages below a predetermined value, voltage responsive means for short-circuiting the former when such predetermined voltage is reached and voltage responsive means for short-circuiting the latter at a predetermined higher voltage.

In testimony whereof I have hereunto affixed my signature.

ALFRED MATTES.